(12) United States Patent
Linton et al.

(10) Patent No.: US 11,001,363 B2
(45) Date of Patent: May 11, 2021

(54) COMPOSITE SPAR FOR AIRCRAFT WING

(71) Applicant: The Boeing Company, Chicago, IL (US)

(72) Inventors: Kim A. Linton, Garden Grove, CA (US); James P. Dobberfuhl, Clinton, WA (US); Jaime E. Baraja, San Pedro, CA (US); Hsi-Yung T. Wu, Cypress, CA (US)

(73) Assignee: THE BOEING COMPANY, Chicago, IL (US)

( * ) Notice: Subject to any disclaimer, the term of this patent is extended or adjusted under 35 U.S.C. 154(b) by 252 days.

(21) Appl. No.: 16/184,469

(22) Filed: Nov. 8, 2018

(65) Prior Publication Data

US 2020/0148326 A1  May 14, 2020

(51) Int. Cl.
- B64C 3/18 (2006.01)
- B64F 5/10 (2017.01)
- B64C 3/26 (2006.01)

(52) U.S. Cl.
CPC ............. B64C 3/185 (2013.01); B64F 5/10 (2017.01); B64C 3/182 (2013.01); B64C 3/187 (2013.01); B64C 3/26 (2013.01)

(58) Field of Classification Search
CPC ......... B64C 3/182; B64C 3/185; B64C 3/187; B64C 3/26; B64F 5/10
USPC ...................................................... 244/123.1
See application file for complete search history.

(56) References Cited

U.S. PATENT DOCUMENTS

| | | | |
|---|---|---|---|
| 5,216,799 A | 6/1993 | Charnock et al. | |
| 5,405,107 A | 4/1995 | Bruno | |
| 5,776,371 A | 7/1998 | Parker | |
| 6,595,467 B2 * | 7/2003 | Schmidt | B23K 31/02 244/119 |
| 7,850,118 B2 * | 12/2010 | Vichniakov | B64C 1/12 244/123.3 |
| 9,096,305 B2 | 8/2015 | Kehrl et al. | |
| 2002/0000492 A1 | 1/2002 | Schmidt | |
| 2002/0081415 A1 * | 6/2002 | Toi | B64C 1/12 428/102 |

(Continued)

OTHER PUBLICATIONS

Extended European Search Report prepared by the European Patent Office in application No. EP 19 20 0749.0 completed Dec. 13, 2019.

(Continued)

Primary Examiner — Richard R. Green
Assistant Examiner — Brady W Frazier
(74) Attorney, Agent, or Firm — McDonnell Boehnen Hulbert & Berghoff LLP

(57) ABSTRACT

An example aircraft wing includes a first skin, a second skin opposite to the first skin, and a composite spar. The composite spar includes a double-flanged spar cap, a single-flanged spar cap, a spar web connecting the double-flanged spar cap and the single-flanged spar cap, and a tear strap. The double-flanged spar cap includes an inward-facing flange and a first outward-facing flange, and the inward-facing flange and the first outward-facing flange are integrated with the first skin during a co-curing process. The single-flanged spar cap includes a second outward-facing flange that is attached to the second skin. The tear strap is stitched to an inner side of the spar web along at least a portion of a length of the composite spar.

20 Claims, 18 Drawing Sheets

(56) References Cited

U.S. PATENT DOCUMENTS

| | | | |
|---|---|---|---|
| 2002/0134889 A1* | 9/2002 | Schmidt | B64C 1/12 244/133 |
| 2010/0025529 A1* | 2/2010 | Perry | B29C 65/562 244/117 R |
| 2012/0308770 A1* | 12/2012 | Eli-Eli | B64C 1/064 428/120 |
| 2014/0224043 A1* | 8/2014 | Tighe | B64C 3/187 73/865.8 |
| 2015/0183506 A1* | 7/2015 | Garcia Martin | B29D 99/0014 244/123.1 |
| 2015/0329197 A1* | 11/2015 | Seack | B64C 3/185 244/123.7 |
| 2015/0375843 A1* | 12/2015 | Griess | B64C 3/182 244/133 |
| 2016/0176499 A1* | 6/2016 | Evans | B64C 3/18 244/123.1 |
| 2017/0057615 A1* | 3/2017 | Charles | B32B 5/024 |
| 2018/0086429 A1 | 3/2018 | Sheppard et al. | |

OTHER PUBLICATIONS

Karal, Michael, AST Composite Wing Program—Executive Summary, Mar. 2001, available at https://ntrs.nasa.gov/archive/nasa/casi.ntrs.nasa.gov/20010033249.pdf.

* cited by examiner

1500

```
┌─────────────────────────────────────────────────┐
│ INTEGRATING A DOUBLE-FLANGED SPAR CAP OF A FRONT│
│ SPAR OF AN AIRCRAFT WING AND A DOUBLE-FLANGED SPAR│ — 1502
│ CAP OF A REAR SPAR OF THE AIRCRAFT WING WITH A FIRST│
│ SKIN OF THE AIRCRAFT WING DURING A CO-CURING PROCESS│
└─────────────────────────────────────────────────┘
                         ↓
┌─────────────────────────────────────────────────┐
│ AFTER THE CO-CURING PROCESS, FASTENING A PLURALITY│
│ OF RIBS TO A SPAR WEB OF THE FRONT SPAR AND TO A SPAR│ — 1504
│          WEB OF THE REAR SPAR                    │
└─────────────────────────────────────────────────┘
                         ↓
┌─────────────────────────────────────────────────┐
│ FASTENING A SINGLE-FLANGED SPAR CAP OF THE FRONT│
│ SPAR AND A SINGLE-FLANGED SPAR CAP OF THE REAR SPAR│
│ TO A SECOND SKIN OF THE AIRCRAFT WING, THE SECOND│ — 1506
│        SKIN BEING OPPOSITE TO THE FIRST SKIN     │
└─────────────────────────────────────────────────┘
```

FIG. 15

COMPOSITE SPAR FOR AIRCRAFT WING

FIELD

The present disclosure relates generally to aircraft wings, and more particularly, to composite spars for aircraft wings and methods for assembling aircraft wings.

BACKGROUND

Composite materials are increasingly used as substitutes for conventional materials, such as aluminum and steel alloys, in various structural components due to the generally high strength-to-weight ratio inherent in composite materials. For instance, composite parts are presently used as parts for aircrafts. Composite materials generally include a network of reinforcing fibers that are applied in layers, referred to as plies, and a resin that substantially wets the reinforcing fibers to form an intimate contact between the resin and the reinforcing fibers.

Designs for some aircraft wings employ composite structural components in the aircraft wing, such as in composite spars. An aircraft wing can include one or more spars that are some of the main structural components of the aircraft wing and run along a length of the aircraft wing. During flight, the one or more spars can experience upward bending loads resulting from lift forces acting on the aircraft wing and can react vertical sheer loads. Further, while the aircraft is on the ground, the one or more spars can experience downward bending loads due to the weight of the aircraft wing and any components within or mounted to the aircraft wing.

SUMMARY

In one example, a composite spar for an aircraft wing is described. The composite spar includes a double-flanged spar cap, a single-flanged spar cap, a spar web connecting the double-flanged spar cap and the single-flanged spar cap, and a tear strap. The double-flanged spar cap includes an inward-facing flange and a first outward-facing flange, with the inward-facing flange and the first outward-facing flange being configured to be integrated with a first skin of the aircraft wing during a co-curing process. The single-flanged spar cap includes a second outward-facing flange that is configured to be attached to a second skin of the aircraft wing. The second skin is opposite to the first skin. The tear strap is stitched to an inner side of the spar web along at least a portion of a length of the composite spar.

In another example, an aircraft wing is described. The aircraft wing includes a first skin, a second skin opposite to the first skin, and a composite spar. The composite spar includes a double-flanged spar cap, a single-flanged spar cap, a spar web connecting the double-flanged spar cap and the single-flanged spar cap, and a tear strap. The double-flanged spar cap includes an inward-facing flange and a first outward-facing flange, and the inward-facing flange and the first outward-facing flange are stitched to the first skin and are integrated with the first skin during a co-curing process. The single-flanged spar cap includes a second outward-facing flange that is attached to the second skin. The tear strap is stitched to an inner side of the spar web along at least a portion of a length of the composite spar.

In another example, a method of assembling an aircraft wing is described. The method includes integrating a double-flanged spar cap of a front spar of the aircraft wing and a double-flanged spar cap of a rear spar of the aircraft wing to a first skin of the aircraft wing during a co-curing process. In addition, the method includes, after the co-curing process, fastening a plurality of ribs to a spar web of the front spar and to a spar web of the rear spar. Further, the method includes fastening a single-flanged spar cap of the front spar and a single-flanged spar cap of the rear spar to a second skin of the aircraft wing, with the second skin being opposite to the first skin.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 15 shows a flowchart of a method, according to an example.

DETAILED DESCRIPTION

Figure 1:
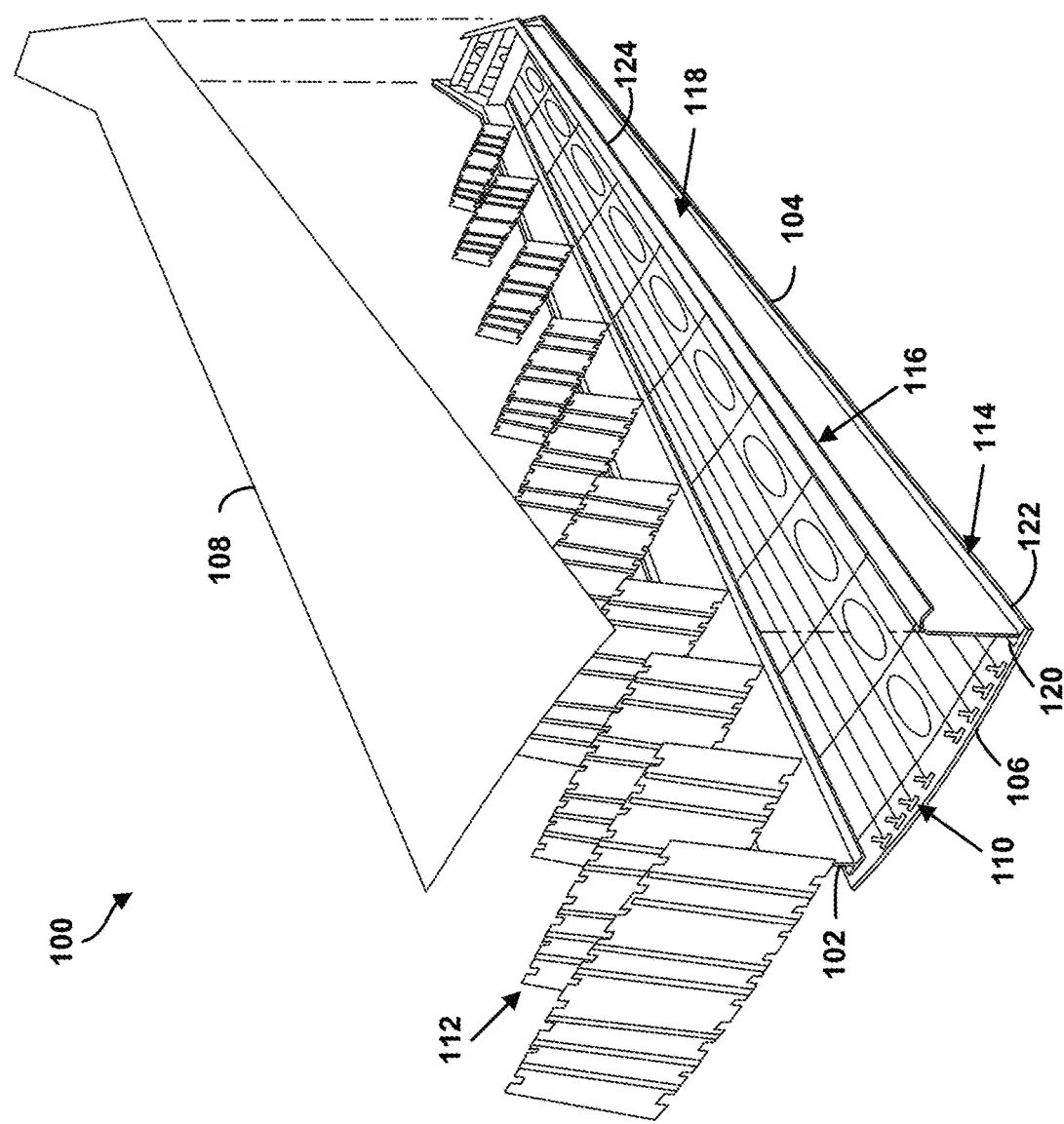
FIG. 1 illustrates an aircraft wing, according to an example.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are composite spars for aircraft wings as wells as methods for assembling aircraft wings. An example composite spar includes a double-flanged spar cap, a single-flanged spar cap, a spar web connecting the double-flanged spar cap and the single-flanged spar cap, and a tear strap stitched to an inner side of the spar web along at least a portion of a length of the composite spar.

The double-flanged spar cap includes an inward-facing flange and a first outward-facing flange that are integrated with a first skin of the aircraft wing. Further, the single-flanged spar cap includes a second-outward facing flange that is configured to be attached to a second skin of the aircraft wing that is opposite to the first skin. For instance, the first skin can be a lower skin and the second skin can be an upper skin. Alternatively, the first skin can be an upper skin and the second skin can be a lower skin. Due to the double-flanged spar cap and the single-flanged spar cap, a cross-section of the composite can resemble the shape of the letter "J".

The configuration of the composite spar disclosed herein can improve the speed at which an aircraft wing can be assembled, thereby reducing cost. Some conventional composite spars only include inward-facing flanges on both caps. With this arrangement, a first skin can be attached to a first inward-facing flange, and then the second skin can then be positioned over the second inward-facing flange. When the second skin is positioned over the second inward-facing flange, the second skin limits access to the second inward-facing flange. In order to fasten the second inward-facing flange to the second skin, a mechanic may need to access an interior of the aircraft wing to fasten the second skin to the second inward-facing flange. In contrast, the composite spars disclosed herein eliminate this problem, since a second skin can be fastened to the second outward-facing flange from an outside of the aircraft wing and without requiring access to an interior of the aircraft wing.

The configuration of the composite spar disclosed herein can also provide a stronger connection to a skin of the aircraft wing. With a conventional spar having only inward-facing flanges, when the spar is attached to an upper skin, the upper skin tends to bellow outwards, which can pull the inward-facing flange upwards and weaken the spar web to cap radius by applying a local tension load on the weak interlaminate strength of a composite laminate. By attaching the upper skin to an outward-facing flange instead of an inward-facing flange, the connection between the spar and the upper skin compresses the plies together in the radius, thereby increasing the material's capability. Similarly, attaching a skin, such as a lower skin, to both an inward-facing flange and an outward-facing flange can better stabilize the spar with respect to the skin and increase the performance of the spar-flange-to-web radiuses.

Additionally, the composite spars disclosed herein can be stitched to the first skin and integrated with the first skin of the aircraft wing during a co-curing process. Instead of separately curing the first skin and the composite spar and then fastening the first skin to the composite spar with hundreds of fasteners, the first skin and the composite spar can be stitched together and then cured together at the same time. For instance, a dry carbon preform spar can be stitched to a dry carbon preform first skin, and the uncured composite spar and uncured first skin can then be inserted within an oven, such that the first skin and the composite spar can be co-cured at the same time within the oven. Multiple composite spars can be co-cured to the first skin. Stitching the first skin to the composite spar(s) can make it possible to co-cure the composite spar(s) to the first skin. The co-curing process can reduce manufacturing time and costs. Stitching can fix spar-to-skin positions and eliminate the requirement to add hundreds of fail-safe damage arrestment fasteners after curing between the spars and the first skin. The co-curing process and spar shape can also make the aircraft wing less susceptible to electromagnetic effects, such as those from lightning strikes, since stitching and then co-curing can eliminate the need for fasteners between the first skin and the composite spar(s) in the interior of the wing box. The second outward-facing flange of the spar can also eliminate interior wing box fasteners by positioning the fasteners to attach the second skin to the spar on the exterior side of the wing box.

Further, in some examples, other components of an aircraft wing can also be co-cured with the first skin and the composite spar. For instance, one or more rib posts, configured to be attached to ribs of the aircraft wing, can be stitched to the composite spar and then co-cured with the composite spar and the first skin. Similarly, one or more stiffeners can be stitched to an inner side of the spar web along at least a portion of a height of the composite spar and then co-cured with the composite spar and the first skin. Co-curing additional components with the composite spar and the first skin can further reduce manufacturing time and costs. Stitching one or both of the rib posts and stiffeners can eliminate the need for fasteners and sealing, thereby reducing assembly costs.

The tear strap can strengthen the spar web and help to prevent cracks within the spar web from spreading. For instance, the tear strap can be located between the double-flanged spar cap and the single-flanged spar cap. In this position, the tear strap can prevent a crack formed between the single-flanged spar cap and the tear strap from spreading to an area between the double-flanged spar cap and the tear strap. The use of the tear strap can also allow the thickness of the spar web of the composite spar to be reduced, thereby reducing a weight of the composite spar. In addition, the use of the tear strap can facilitate increasing the fibers in the zero-degree direction along the length of the wing since forty-five-degree plies are not the only feature stopping the progression of cracks.

Various other features and variations of the described systems, as well as corresponding methods, are described hereinafter with reference to the accompanying figures.

Referring now to FIG. 1, FIG. 1 illustrates an aircraft wing 100, according to an example. As shown in FIG. 1, aircraft wing 100 includes a rear spar 102, a front spar 104, a first skin 106, a second skin 108, a plurality of stringers 110, and a plurality of ribs 112. In FIG. 1, first skin 106 is depicted as a lower skin and second skin 108 is depicted as an upper skin. In other examples, first skin 106 could be an upper skin and second skin 108 could be a lower skin. Rear spar 102, front spar 104, first skin 106, second skin 108, plurality of stringers 110, and plurality of ribs 112 can be made from a same or different composite material. A composite material is two or more constituent materials with different physical or chemical properties. The composite material may be a non-crimp fabric composite. The composite material may include a graphite composite, for instance, or a carbon fiber composite.

In line with the discussion above, front spar 104 can include a double-flanged spar cap 114, a single-flanged spar cap 116, and a spar web 118 connecting the double flanged-spar cap 114 and the single-flanged spar cap 116. Double-flanged spar cap 114, in turn, includes an inward-facing flange 120 and a first outward-facing flange 122. Inward-facing flange 120 and first outward-facing flange 122 can be integrated with first skin 106 during a co-curing process. For instance, front spar 104 can be stitched or otherwise adhered to first skin 106, and front spar 104 and first skin can then be placed in an oven and co-cured.

Further, single-flanged spar cap 116 includes a second outward facing flange 124, which can be attached to second skin 108. For instance, second outward facing flange 124 can be fastened to second skin 108 using a plurality of fasteners.

Similarly, rear spar 102 can include a double-flanged spar cap, a single-flanged spar cap, and a spar web. Rear spar 102 can also be integrated with first skin 106 during the co-curing process.

Figure 2:
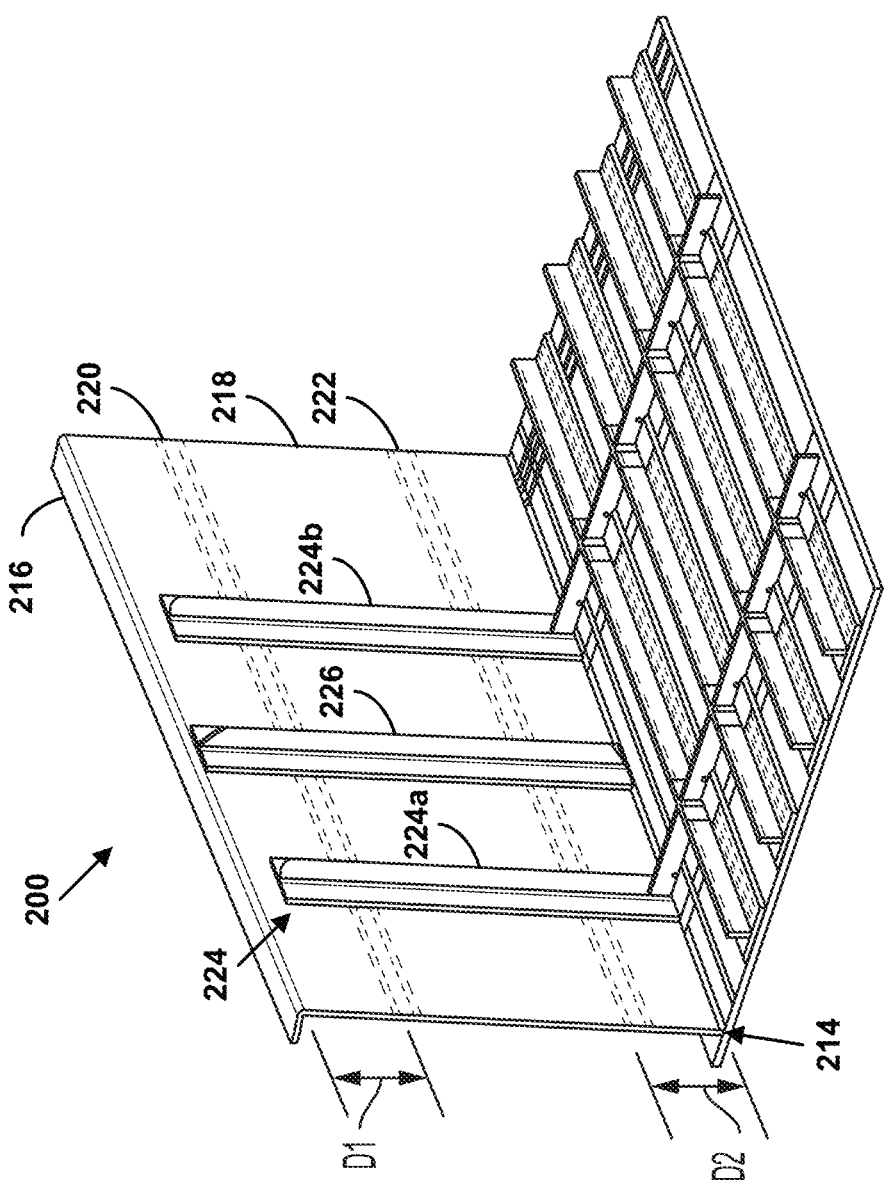
FIG. 2 illustrates a partial view of a composite spar, according to an example.

FIG. 2 illustrates a partial view of a composite spar 200, according to an example. Composite spar 200 can represent rear spar 102 or front spar 104 of FIG. 1. As shown in FIG. 2, composite spar 200 includes a double-flanged spar cap 214, a single-flanged spar cap 216, and a spar web 218 connecting double-flanged spar cap 214 and single-flanged spar cap 216. Further composite spar 200 includes a first tear strap 220, a second tear strap 222, a plurality of rib posts 224, and a stiffener 226.

First tear strap 220 can be a strip of composite material that is stitched to an inner side of spar web 218. Similarly, second tear strap 222 can be a strip of composite material that is stitched to the inner side of spar web 218. In line with the discussion above, first tear strap 220 and second tear strap 222 can be integrated with composite spar 200 during a co-curing process.

First tear strap 220 can be offset from single-flanged spar cap 216 by a first distance D1 that is less than a height of composite spar 200. With this positioning, first tear strap 220 can prevent cracks between first tear strap and single-flanged spar cap 216 from spreading to a middle of spar web 218. Second tear strap 222 can be offset from double-flanged spar cap 214 by a second distance D2 that is less than the height of composite spar 200. Second distance D2 can be the same or different from first distance D1. With this positioning second tear strap 222 can prevent cracks between double-flanged spar cap 216 and second tear strap 222 from spreading to the middle of spar web 218. By using first tear strap 220 and second tear strap 222 to support spar web 218, a thickness of spar web 218 can be reduced, thereby reducing a weight of composite spar 200.

Plurality of rib posts 224 are configured for attaching ribs to composite spar 200. Plurality of rib posts 224 can include holes (not shown) through which fasteners can be inserted. Plurality of rib posts 224 includes a first rib post 224a and a second rib post 224b. Stiffener 226 is positioned between first rib post 224a and second rib post 224b, thereby strengthening spar web 218 in the area between first rib post 224a and second rib post 224b. Plurality of rib posts 224 and/or stiffener 226 can be integrated with composite spar 200 during a co-curing process. Additional stiffeners can also be added, such as a stiffener between second rib post 224b and a third rib post (not shown).

Figure 3:
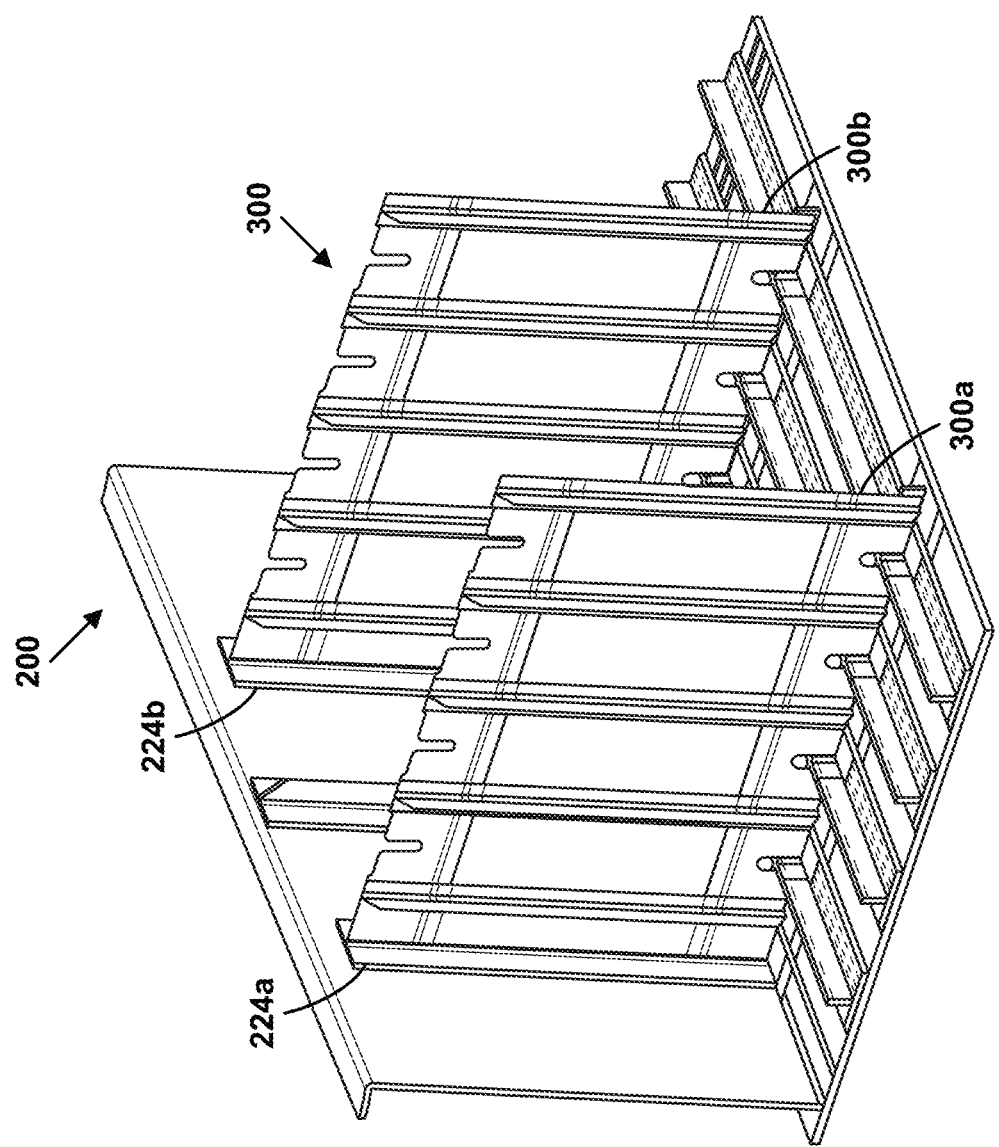
FIG. 3 illustrates a plurality of ribs attached to the composite spar shown in FIG. 2.

FIG. 3 illustrates a plurality of ribs 300 attached to composite spar 200 of FIG. 2. More specifically, FIG. 3 illustrates a first rib 300a attached to first rib post 224a and a second rib 300b attached to second rib post 224b.

Figure 4:
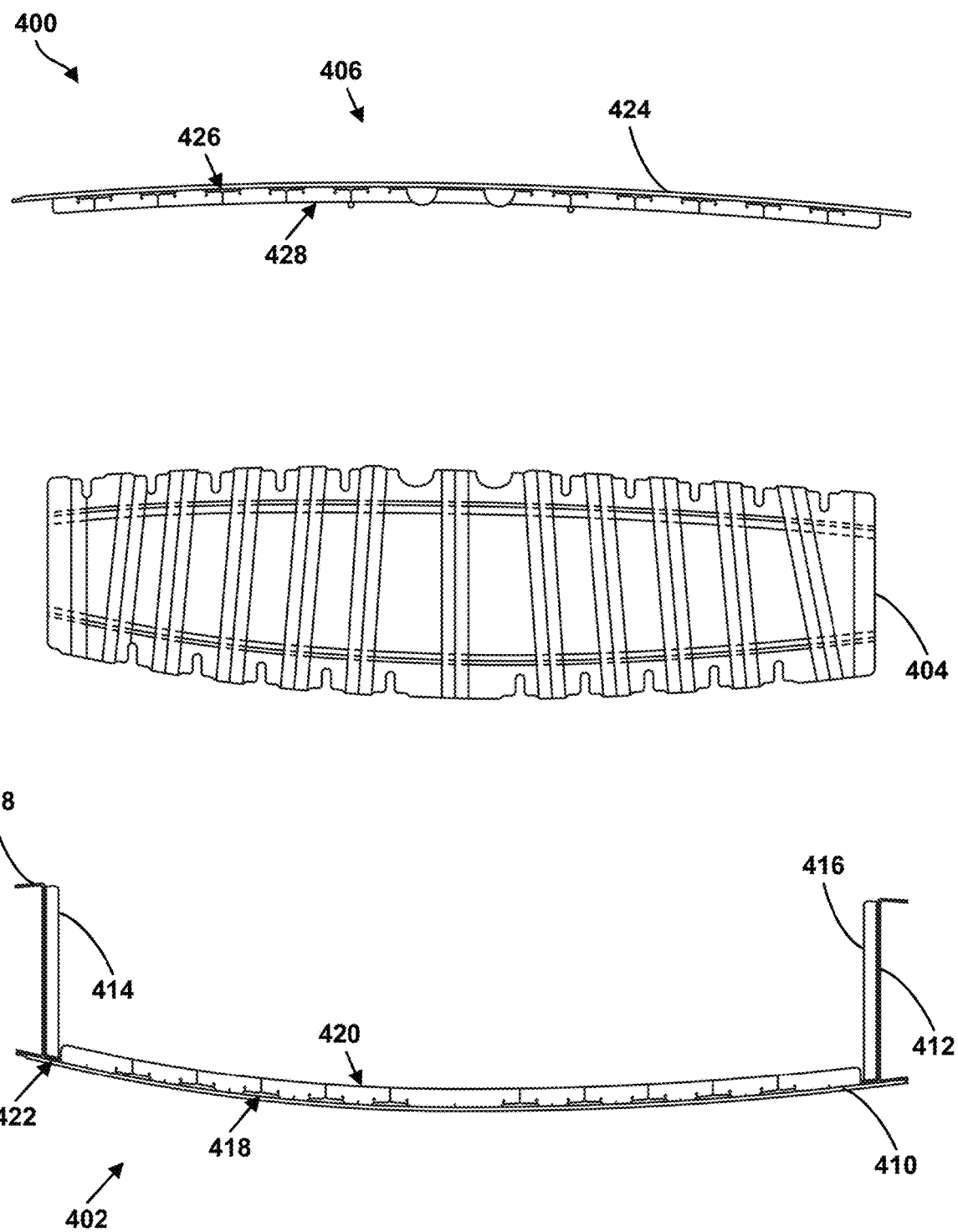
FIG. 4 illustrates a cross-sectional view of a portion of an aircraft wing, according to an example.

FIG. 4 illustrates a cross-sectional view of a portion of an aircraft wing 400, according to an example. As shown in FIG. 4, aircraft wing 400 can include a lower panel assembly 402, a rib 404, and an upper panel assembly 406.

Lower panel assembly 402 can include a front spar 408, a lower skin 410, a rear spar 412, a front rib post 414, a rear rib post 416, a plurality of stringers 418, and a plurality of shear ties 420. Lower panel assembly can also include stiffeners that strengthen a spar web of front spar (not shown) and stiffeners that strengthen a spar web of rear spar (not shown). Individual shear ties of plurality of shear ties 420 can extend between stringers of plurality of stringers 418 and provide additional attachment points for attaching rib 404 to lower panel assembly 402.

All of the components of lower panel assembly 402 can be integrated together during a co-curing process. Front spar 408 and rear spar 412 can be stitched to lower skin 410, front rib post 414 can be stitched to front spar 408, rear rib post 416 can be stitched to rear spar 412, and plurality of stringers 418 and plurality of shear ties 420 can be stitched to lower skin 420. This stitching can make it possible to co-cure all of the components of lower panel assembly 402 without installing fasteners to combine separate details or to act as damage-arrestment features in a co-cured structure.

As further shown in FIG. 4, front rib post 414 support an inward-facing flange 422 of front spar 408. For example, a portion of front rib post 414 can directly contact inward-facing flange 422. This direct contact can help stabilize inward-facing flange 422 with respect to a composite web of front spar 408. In some examples, a tab of front rib post 414 that is parallel to inward-facing flange 422 can be stitched to inward-facing flange 422. Similarly, rear rib post 416 can support an inward-facing flange of rear spar 412.

Upper panel assembly 406 can include an upper skin 424, a plurality of stringers 426, and a plurality of shear ties 428. Individual shear ties of plurality of shear ties 428 can extend between stringers of plurality of stringers 426 and provide attachment points for attaching rib 404 to upper panel assembly 406. All of the components of upper panel assembly 402 can be integrated together during a co-curing process. Plurality of stringers 426 and plurality of shear ties 428 can be stitched to upper skin 424, thereby facilitating co-curing of upper skin 424, plurality of stringers 426 and plurality of shear ties 428 without installing fasteners to combine separate details or to act as damage-arrestment features in a co-cured structure.

Figure 5:
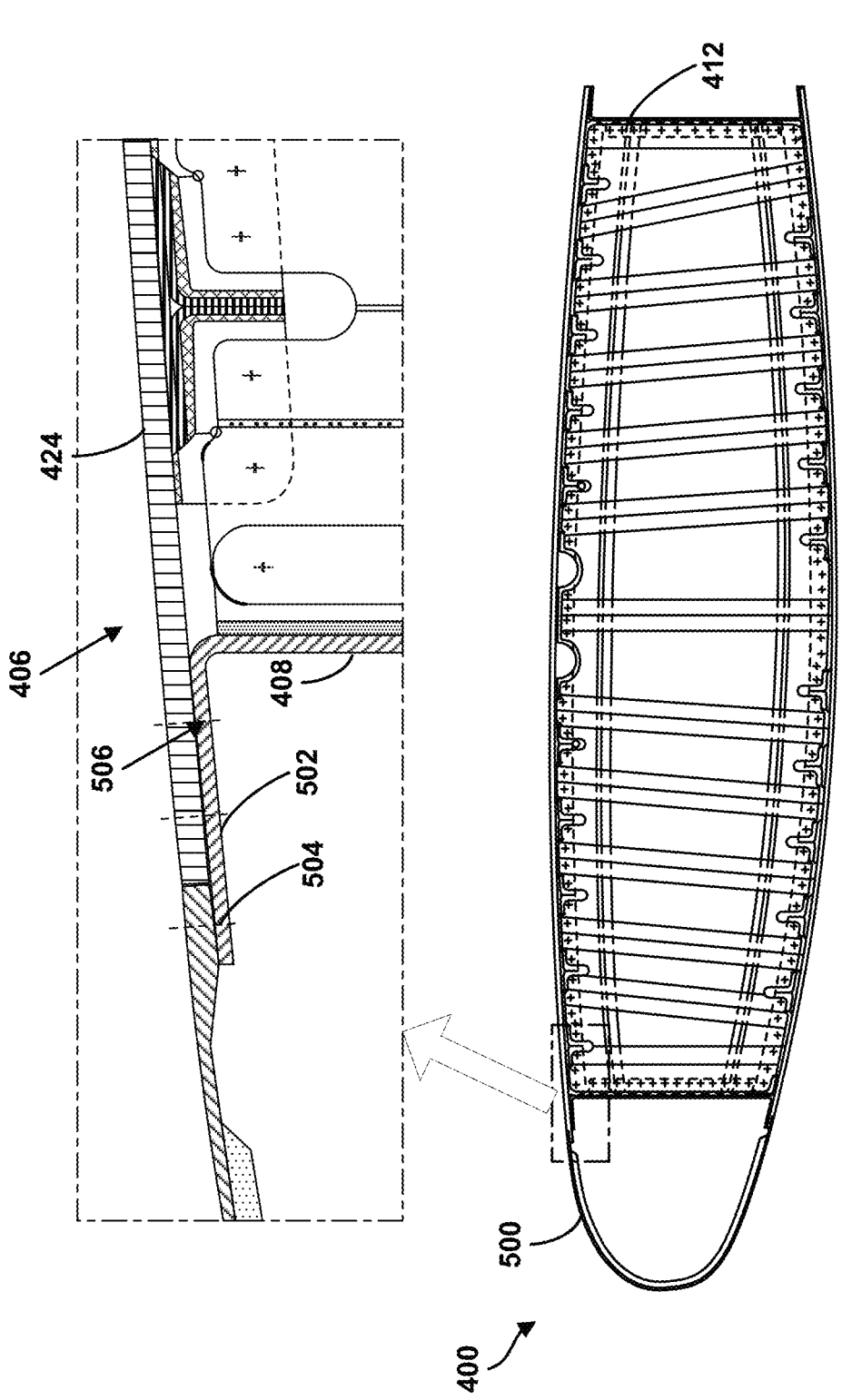
FIG. 5 illustrates an example manner for attaching a leading edge to the portion of the aircraft wing shown in FIG. 4.

FIG. 5 illustrates an example manner for attaching a leading edge 500 to the portion of aircraft wing 400 shown in FIG. 4. As shown in FIG. 5, an outward-facing flange 502 of front spar 408 can extend beyond upper panel assembly 406 and provide a ledge on which leading edge 500 can rest. Outward-facing flange 502 can also include a through-hole 504 through which a fastener can be inserted for fastening leading edge 500 to front spar 408. Directly attaching leading edge 500 to front spar 408 in this manner can eliminate the use of splice plates or wiggle plates for attaching leading edge 500 to upper panel assembly 406.

FIG. 5 also shows a plurality of holes 506 within outward-facing flange 502. Plurality of holes 506 can be used for positioning and fastening outward-facing flange 502 to upper skin 424.

Figure 6:
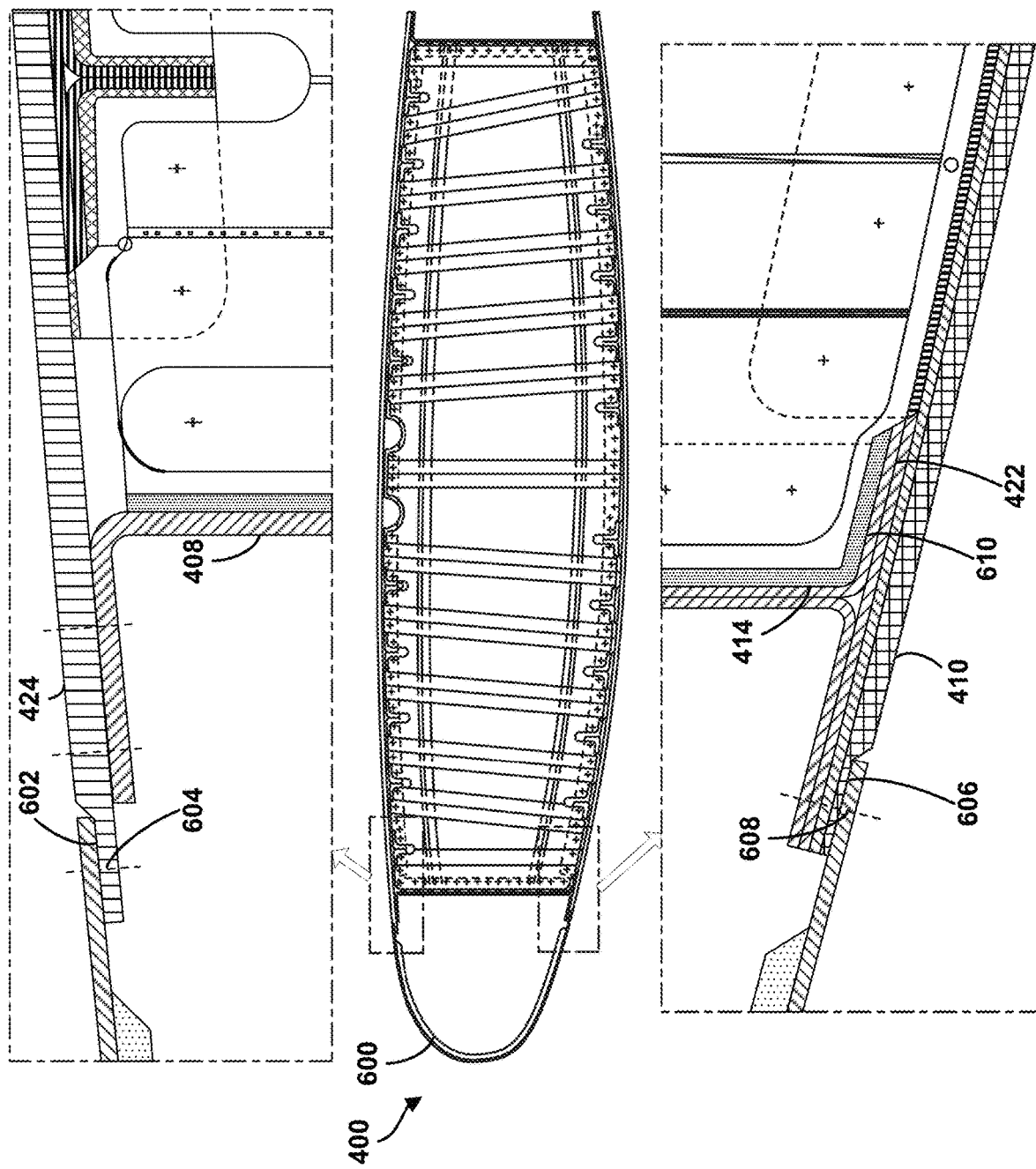
FIG. 6 illustrates another example manner for attaching a leading edge to the portion of the aircraft wing shown in FIG. 4.

FIG. 6 illustrates another example manner for attaching a leading edge 600 to the portion of the aircraft wing 400 shown in FIG. 4. As shown in FIG. 6, upper skin 424 can include a recess 602 on which leading edge 600 can rest. Recess 602 can also include a through-hole 604 through which a fastener can be inserted for fastening leading edge 600 to upper skin 424. Similarly, lower skin 410 can similarly include a recess 606 configured to receive leading edge 600, and a through-hole 608 through which a fastener can be inserted for fastening leading edge 600 to lower skin 410.

FIG. 6 also shows a tab 610 of front rib post 414 that supports inward-facing flange 422. As noted above, with this arrangement, front rib post 414 can help stabilize inward-facing flange 422 with respect to a composite web of front spar 408.

Figure 7:
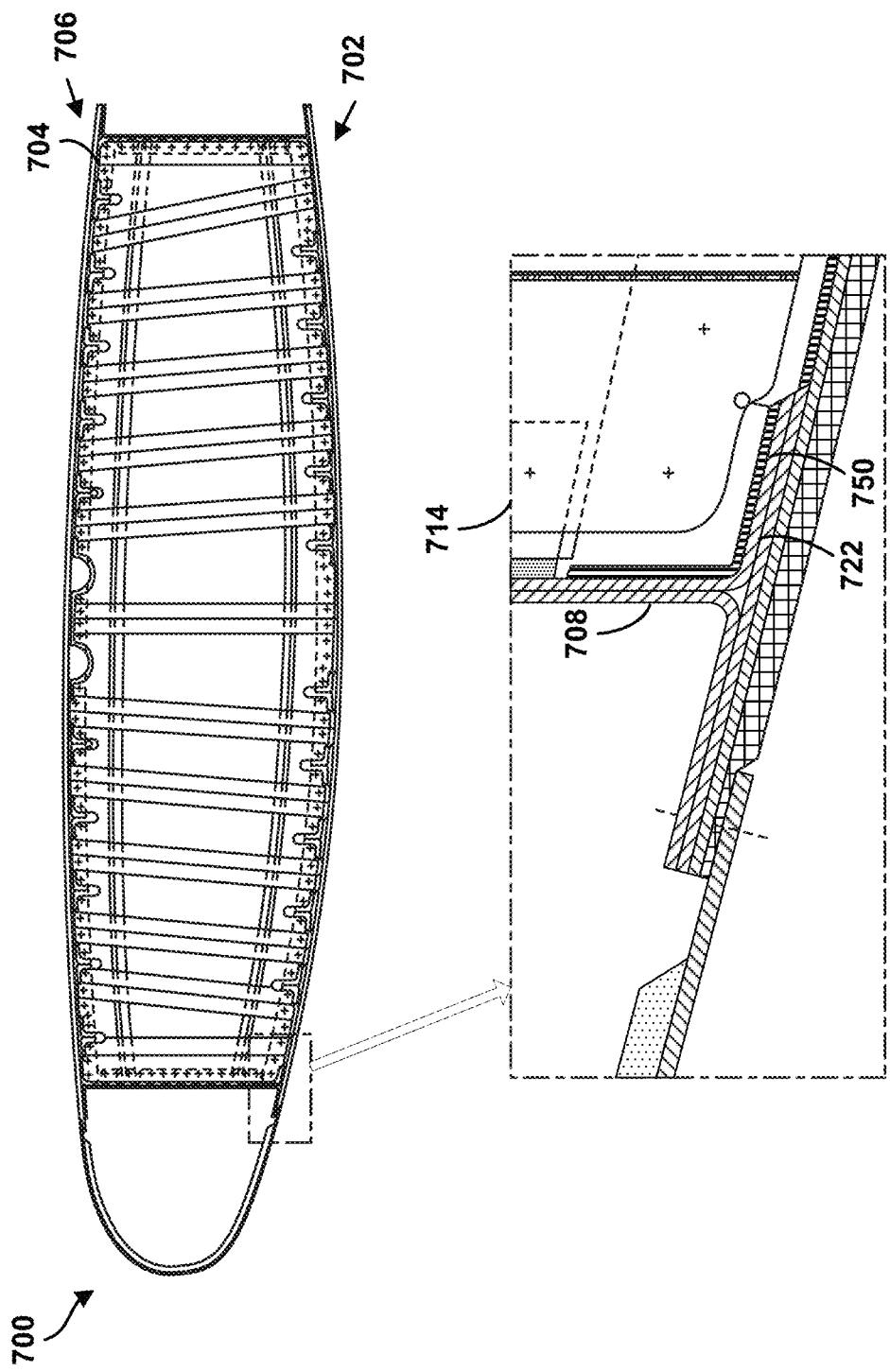
FIG. 7 illustrates a cross-sectional view of another portion of an aircraft wing, according to an example.

FIG. 7 illustrates a cross-sectional view of another portion of an aircraft wing 700, according to an example. Like aircraft wing 400 of FIG. 4, aircraft wing 700 includes a lower panel assembly 702, a rib 704, and an upper panel assembly 706. Further, lower panel assembly 702 includes a front spar 708 having an inward-facing flange 722, and includes a front rib post 714. However, lower panel assembly 702 differs from lower panel assembly 402 of FIG. 4 in that front rib post 714 does not support inward-facing flange 722. Instead, a tab 750 of a shear tie supports inward-facing flange 722. Similarly, a tab of a shear tie can also support an inward-facing flange of a rear spar of lower panel assembly 702. Extending the shear tie to the spar web of front spar 708 provides additional support to the shear tie, which can help the shear tie to react rib loads while also supporting inward-facing flange 722.

Figure 8:
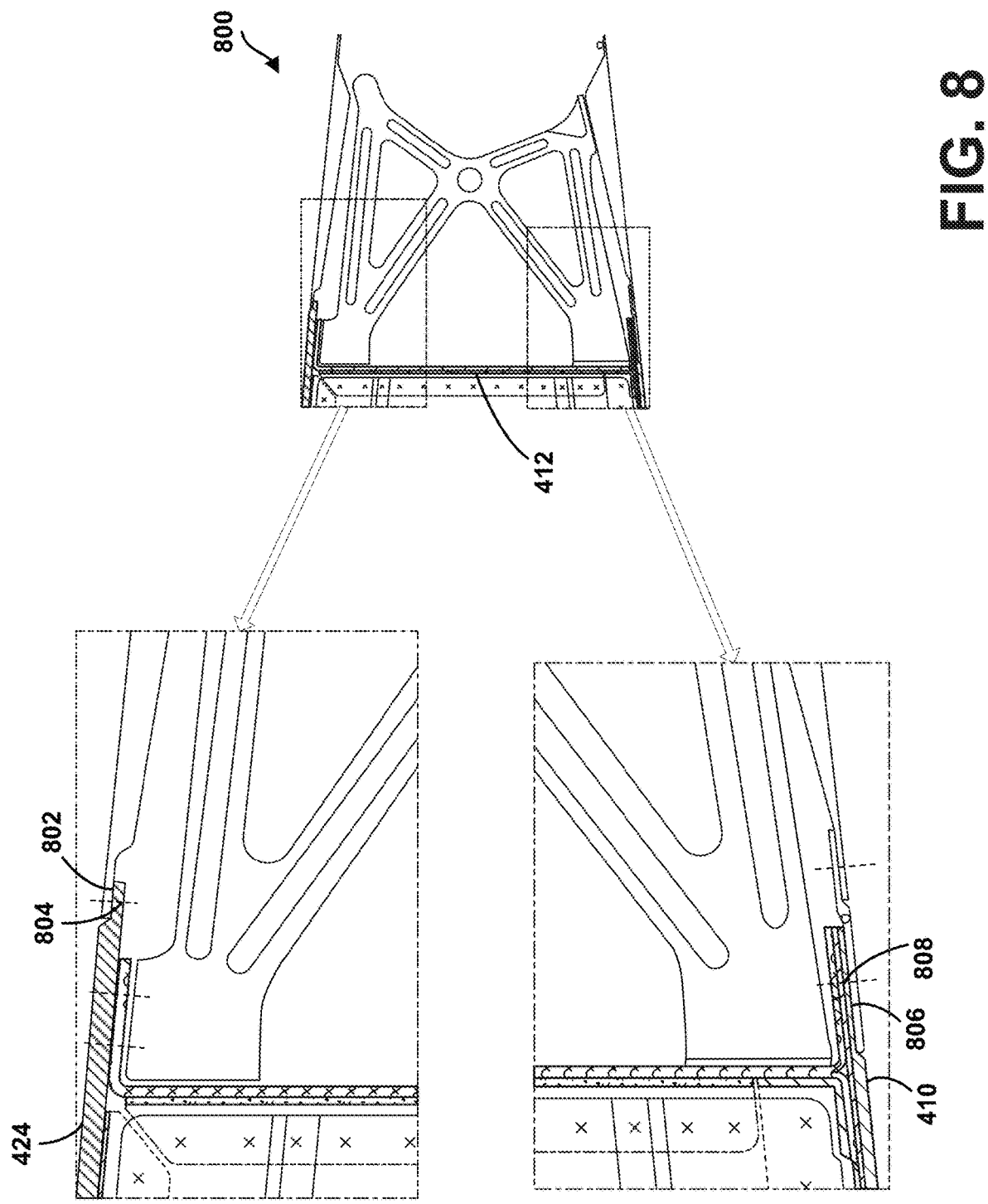
FIG. 8 illustrates an example manner for attaching a trailing edge to the portion of the aircraft wing 400 shown in FIG. 4.

FIG. 8 illustrates an example manner for attaching a trailing edge 800 to the portion of the aircraft wing 400 shown in FIG. 4. As shown in FIG. 8, upper skin 424 can include a recess 802 on which trailing edge 800 can rest. Recess 802 can also include a through-hole 804 through which a fastener can be inserted for fastening trailing edge 800 to upper skin 424. Similarly, lower skin 410 can similarly include a recess 806 configured to receive trailing edge 800, and a through-hole 808 through which a fastener can be inserted for fastening trailing edge 800 to lower skin 410.

Figure 9:
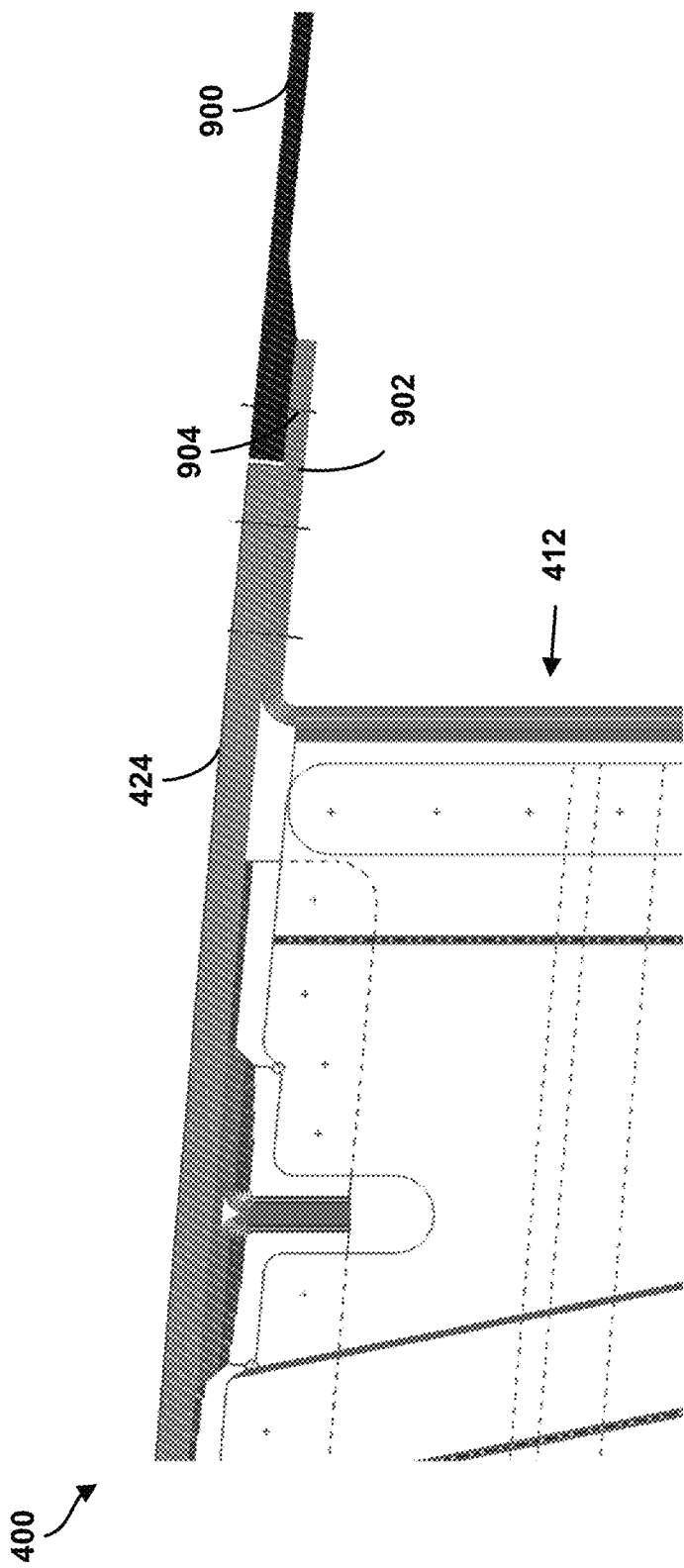
FIG. 9 illustrates another example manner for attaching a trailing edge to the portion of the aircraft wing 400 shown in FIG. 4.

FIG. 9 illustrates an example manner for attaching a trailing edge 900 to the portion of aircraft wing 400 shown in FIG. 4. As shown in FIG. 9, an outward-facing flange 902 of rear spar 412 can extend beyond upper skin 424 and provide a ledge on which trailing edge 900 can rest. Outward-facing flange 902 can also include a through-hole 904 through which a fastener can be inserted for fastening trailing edge 900 to rear spar 412. Directly attaching trailing edge 900 to rear spar 412 in this manner can eliminate the use of splice plates or wiggle plates for attaching trailing edge 900 to upper skin 424.

Figure 10:
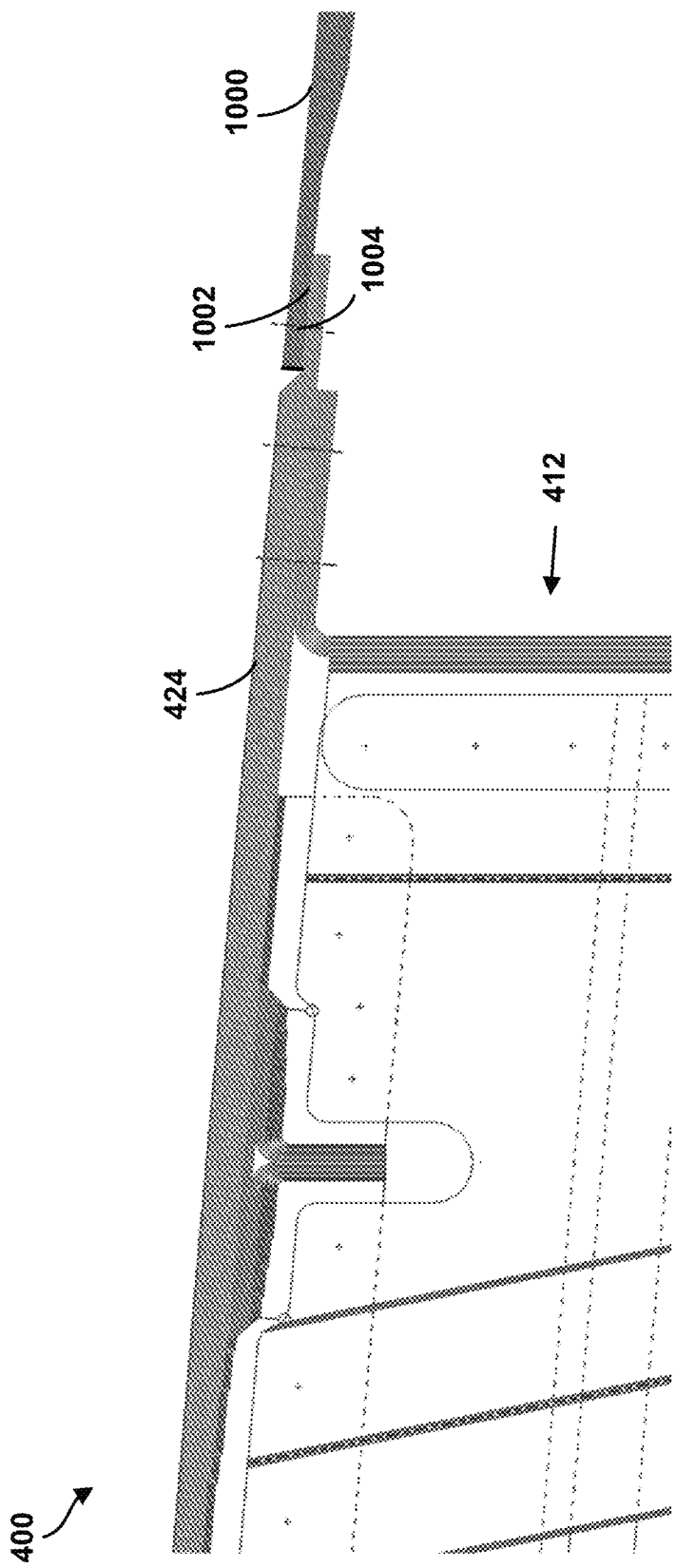
FIG. 10 illustrates another example manner for attaching a trailing edge to the portion of the aircraft wing 400 shown in FIG. 4.

FIG. 10 illustrates another example manner for attaching a trailing edge 1000 to the portion of the aircraft wing 400 shown in FIG. 4. As shown in FIG. 10, upper skin 424 can include a recess 1002 on which trailing edge 1000 can rest. Recess 1002 can also include a through-hole 1004 through which a fastener can be inserted for fastening trailing edge 1000 to upper skin 424. The spar web of any of the composite spars described herein, such as front spar 102 or rear spar 104 of FIG. 1, can include a plurality of plies. Each ply can include a layer of fibers, and the direction in which the fibers are oriented can define an orientation of the ply. For instance, a ply having fibers that are oriented parallel to a longitudinal axis of a structure can be defined as having a 0° orientation. Similarly, a ply having fibers that are oriented perpendicular to the longitudinal axis can be defined as having a 90° orientation.

Figure 11:
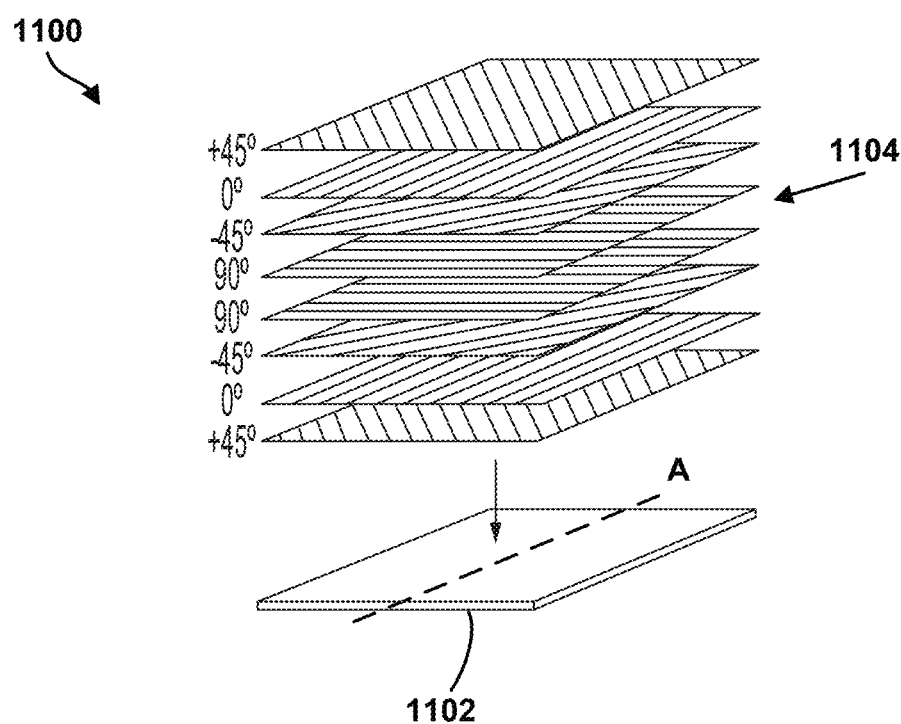
FIG. 11 illustrates a layup structure of a spar web, according to an example.

FIG. 11 illustrates a layup structure 1100 of a spar web 1102, according to an example. Layup structure 1100 includes a plurality of plies 1104 that are oriented in different directions. More specifically, some of the plies have a 0° orientation, some of the plies have a 90° orientation, some of the plies have a +45° orientation, and some of the plies have a −45° orientation.

The number of plies shown in FIG. 11 for each orientation is not meant to be limiting. In one example, more than thirty percent of plurality of plies 1104 can be oriented generally parallel to a longitudinal axis A of spar web 1102. For instance, 33% of the plies can have a 0° orientation, 44% of the plies can have a +45° orientation or a −45° orientation, and 23% of the plies can have a 90° orientation. Having a majority of the plies with a 0° orientation can increase the ability of spar web 1102 to withstand bending forces along a length of spar web 1102. In another example, at least forty percent of the plies of plurality of plies 1104 can be oriented generally parallel to longitudinal axis A. For instance, 40% of the plies can have a 0° orientation, 40% of the plies can have a +45° orientation or a −45° orientation, and 20% of the plies can have a 90° orientation. Other examples are also possible.

A bidirectional weave of fiberglass (not shown) can be added on upper and lower surfaces of layup structure 1100. The bidirectional weave of fiberglass can help with drill break out.

Figure 12:
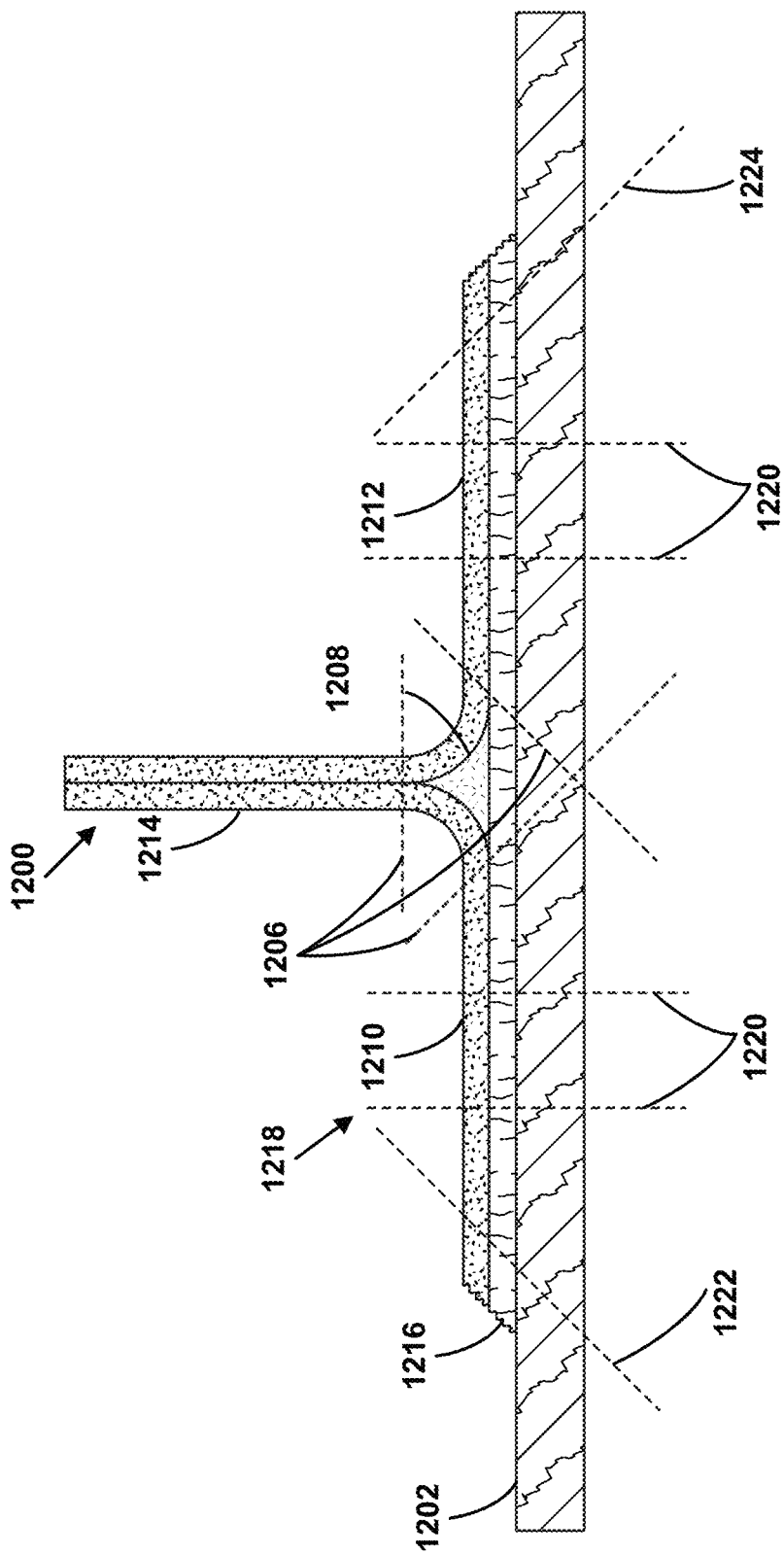
FIG. 12 illustrates stitching techniques for attaching a rib post to a spar web, according to an example.

FIG. 12 illustrates stitching techniques that can be used for stitching a rib post 1200 to a spar web 1202. As shown in FIG. 12, rib post 1200 can be stitched to spar web 1202 using fillet stitching 1206 that encapsulates a fillet region 1208 formed at a junction between a first rib-post flange 1210, a second rib-post flange 1212, and a rib-post web 1214. Fillet stitching 1206 can prevent any fillet delamination from spreading into first rib-post flange 1210, second rib-post flange 1212, and rib-post web 1214. Some of fillet stitching 1206 can also capture a base charge 1216 provided between rib post 1200 and spar web 1202.

As further shown in FIG. 12, rib post 1200 can be stitched to spar web 1202 using flange stitching 1218 provided along a length of first rib-post flange 1210 and second rib-post flange 1212. Flange stitching 1218 includes flange-interior stitches 1220, which can prevent damage in first rib-post flange 1210 or second rib-post flange 1212 from growing and causing first rib-post flange 1210 or second rib-post flange 1212 to separate from spar web 1202. Flange stitching 1218 also includes a first flange-edge stitch 1222 and a second flange-edge stitch 1224. First rib-post flange 1210 includes a slanted outer edge that slants in a first direction, and first flange-edge stitch 1222 slants in the first direction. Second rib-post flange 1212 includes a slanted outer edge that slants in a second direction, and second flange-edge stitch 1224 slants in the second direction. First flange-edge stitch 1222 and second flange-edge stitch 1224 can help prevent damage that occurs in another area of spar web 1202 from weakening an interface between rib post 1200 and spar web 1202.

Figure 13:
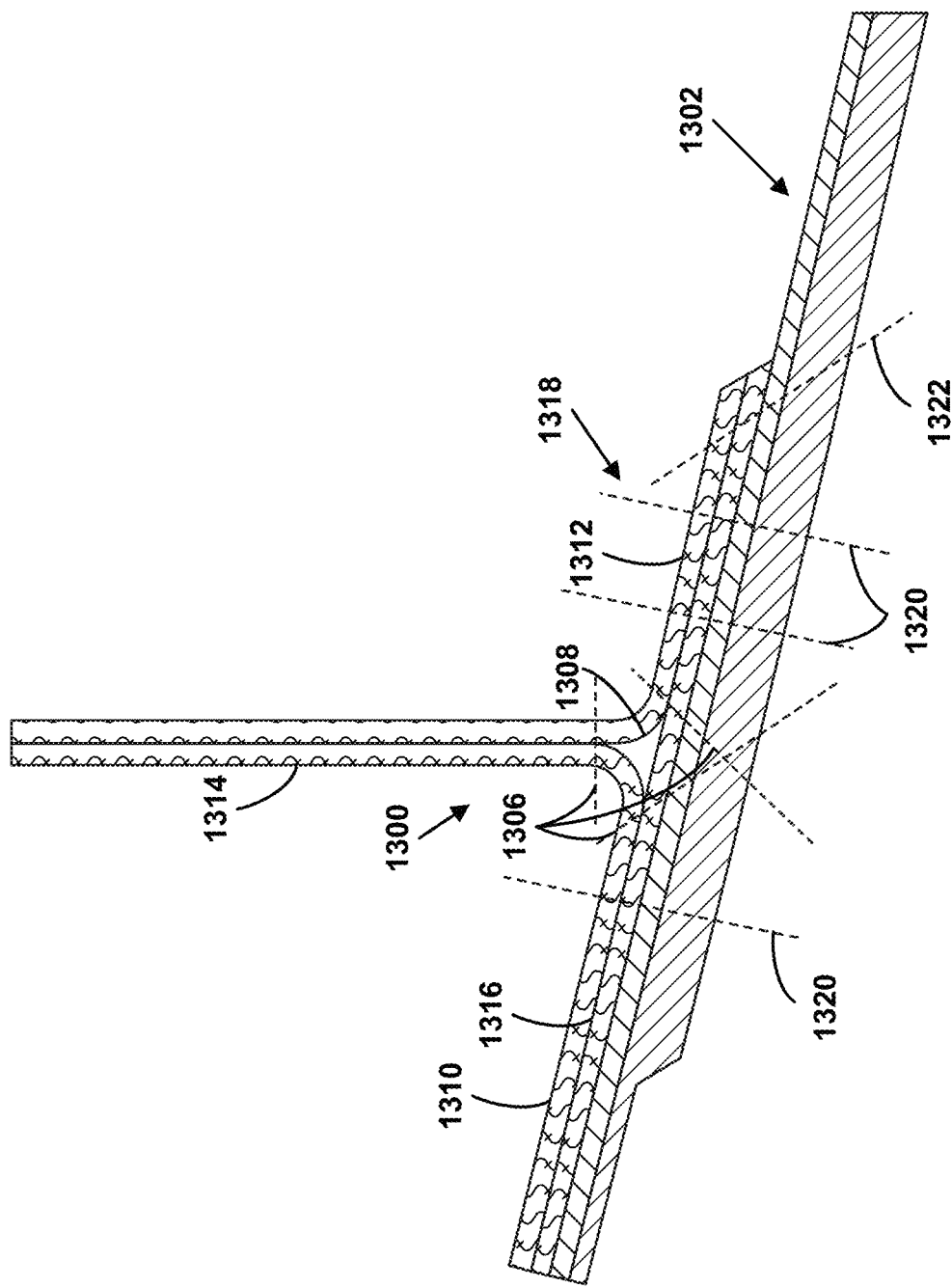
FIG. 13 illustrates stitching techniques for attaching a double-flanged spar cap to a skin, according to an example.

FIG. 13 illustrates stitching techniques that can be used for stitching a double-flanged spar cap 1300 to a skin 1302. As shown in FIG. 13, double-flanged spar cap 1300 can be stitched to skin 1302 using fillet stitching 1306 that encapsulates a fillet region 1308 formed at a junction between an outward-facing flange 1310, an inward-facing flange 1312, and a spar web 1314. Fillet stitching 1306 can prevent any fillet delamination from spreading into outward-facing flange 1310, inward-facing flange 1312, and spar web 1314. Some of fillet stitching 1306 can also capture a base charge 1316 provided between double-flanged spar cap 1300 and skin 1302.

As further shown in FIG. 13, double-flanged spar cap 1300 can be stitched to skin 1302 using flange stitching 1318 provided along a length of outward-facing flange 1310 and inward-facing flange 1312. Flange stitching 1318 includes flange-interior stitches 1320, which can prevent damage in outward-facing flange 1310 or inward-facing flange 1312 from growing and causing outward-facing flange 1310 or inward-facing flange 1312 to separate from skin 1302. Flange stitching 1318 also includes a flange-edge stitch 1322. Inward-facing flange 1312 includes a slanted outer edge that slants in a first direction, and flange-edge stitch 1322 slants in the first direction. Flange-edge stitch 1322 can help prevent damage that occurs in another area of skin 1302 from weakening an interface between double-flanged spar cap 1300 and skin 1302.

Figure 14:
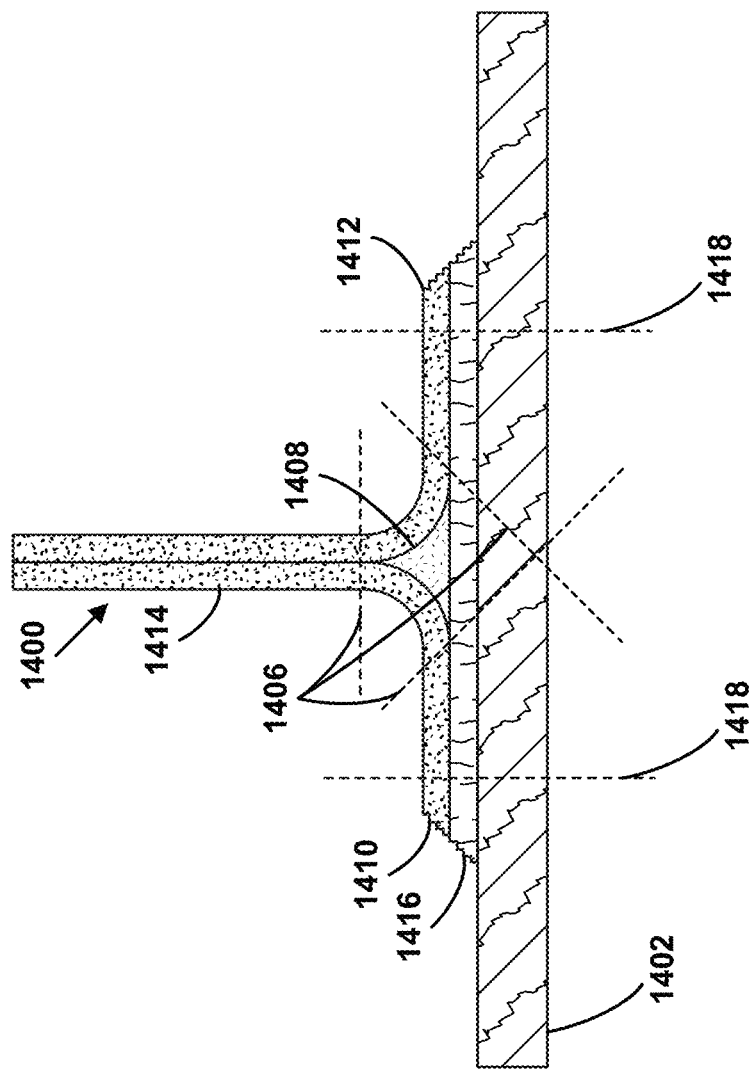
FIG. 14 illustrates stitching techniques for attaching a stiffener to a spar web, according to an example.

FIG. 14 illustrates stitching techniques that can be used for stitching a stiffener 1400 to a spar web 1402. As shown in FIG. 14, stiffener 1400 can be stitched to spar web 1402 using fillet stitching 1406 that encapsulates a fillet region 1408 formed at a junction between a first stiffener flange 1410, a second stiffener flange 1412, and a stiffener web 1414. Fillet stitching 1406 can prevent any fillet delamination from spreading into first stiffener flange 1410, second stiffener flange 1412, and stiffener web 1414. Some of fillet stitching 1406 can also capture a base charge 1416 provided between stiffener 1400 and spar web 1402.

As further shown in FIG. 14, stiffener 1400 can be stitched to spar web 1402 using flange-interior stitches 1418 provided along a length of first stiffener flange 1410 and second stiffener flange 1412. Flange-interior stitches 1418 can prevent damage in first stiffener flange 1410 or second stiffener flange 1412 from growing and causing first stiffener flange 1410 or second stiffener flange 1412 to separate from spar web 1402.

FIG. 15 shows a flowchart of a method, according to an example. Method 1500 shown in FIG. 15 presents an embodiment of a method that, for example, could be carried out to assemble any of the aircraft wings described herein, such as aircraft wing 100 of FIG. 1. Method 1500 could be carried out by one or more operators and/or one or more robotic devices.

Method 1500 can include one or more operations, functions, or actions as illustrated by one or more of blocks 1502-1506. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 1502, method 1500 includes integrating a double-flanged spar cap of a front spar of an aircraft wing and a double-flanged spar cap of a rear spar of the aircraft wing with a first skin of the aircraft wing during a co-curing process. The first skin can be a lower skin or an upper skin of the aircraft wing. In line with the discussion above, the co-curing process can involve stitching or otherwise adhering the double-flanged spar cap of the front spar and the double-flanged spar cap of the rear spar to the first skin, and then placing the double-flanged spar cap of the rear spar, the double-flanged spar cap of the front spar, and the first skin in their assembled state in an oven, and curing the double-flanged spar cap of the front spar, the double-flanged spar cap of the rear spar, and the first skin in the oven.

At block 1504, method 1500 includes after the co-curing process, fastening a plurality of ribs to a spar web of the front spar and to a spar web of the rear spar. For one or more respective ribs of the plurality of ribs, the fastening at block 1504 can involve inserting a first fastener through a hole in a rib post coupled to the spar web of the front spar and a first hole in the rib, and inserting a second fastener through a hole in a rib post coupled to the spar web of the spar web and a second hole in the rib.

At block 1506, method 1500 includes fastening a single-flanged spar cap of the front spar and a single-flanged spar cap of the rear spar to a second skin of the aircraft wing, the second skin being opposite to the first skin. For instance, the first skin can be a lower skin and the second skin can be an upper skin. Or the first skin can be an upper skin and the second skin can be a lower skin. The fastening at block 1506 can involve inserting a first fastener through a hole in an outward-facing flange of the single-flanged spar cap of the front spar and a first hole in the second skin, and inserting a second fastener through a hole in an outward-facing flange of the single-flanged spar cap of the rear spar and a second hole in the second skin.

Figure 16:
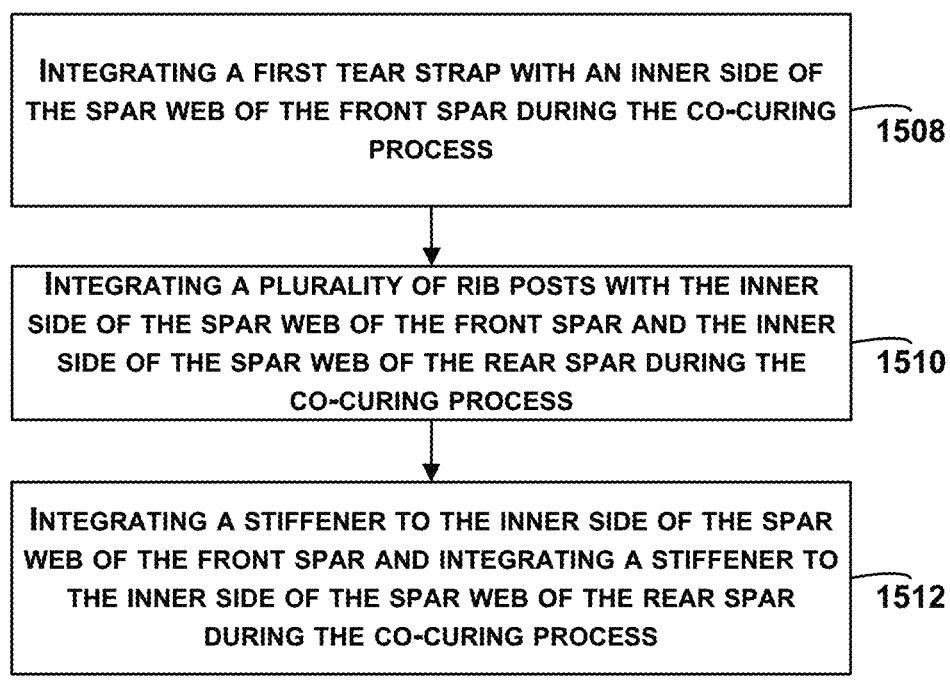
FIG. 16 shows additional operations that can be carried out in conjunction with the method shown in FIG. 15, according to an example.

FIG. 16 shows additional operations that can be carried out in conjunction with method 1500 of FIG. 15, according to an example. Blocks 1508, 1510, and 1512 of FIG. 16 could be performed as part of block 1502 of FIG. 15.

At block 1508, FIG. 16 includes integrating a tear strap with an inner side of the spar web of the front spar during the co-curing process. The tear strap could be the first tear strap 220 or the second tear strap 222 of FIG. 2, for example. Block 1508 can also include stitching the tear strap to the inner side of the spar web of the front spar prior to the co-curing process.

At block 1510, FIG. 16 includes integrating a plurality of rib posts with the inner side of the spar web of the front spar and the inner side of the spar web of the rear spar during the co-curing process. The plurality of rib posts could be plurality of rib posts 224 of FIG. 2, for example. Block 1510 can also include stitching the plurality of rib posts to the inner side of the spar web prior to the co-curing process. In some examples, the plurality of rib posts can also be integrated with the inward-facing flange of the front spar and the inward-facing flange of the rear spar during the co-curing process.

At block 1512, FIG. 16 includes integrating a stiffener with the inner side of the spar web of the front spar and integrating a stiffener with the inner side of the spar web of the rear spar during the co-curing process. The stiffener could be stiffener 226 of FIG. 2, for example. Block 1512 can also include stitching the stiffener to the inner side of the spar web prior to the co-curing process. In some examples, a first stiffener can be integrated with the inward-facing flange of the front spar and a second stiffener can be integrated with the inward-facing flange of the rear spar during the co-curing process.

Figure 17:
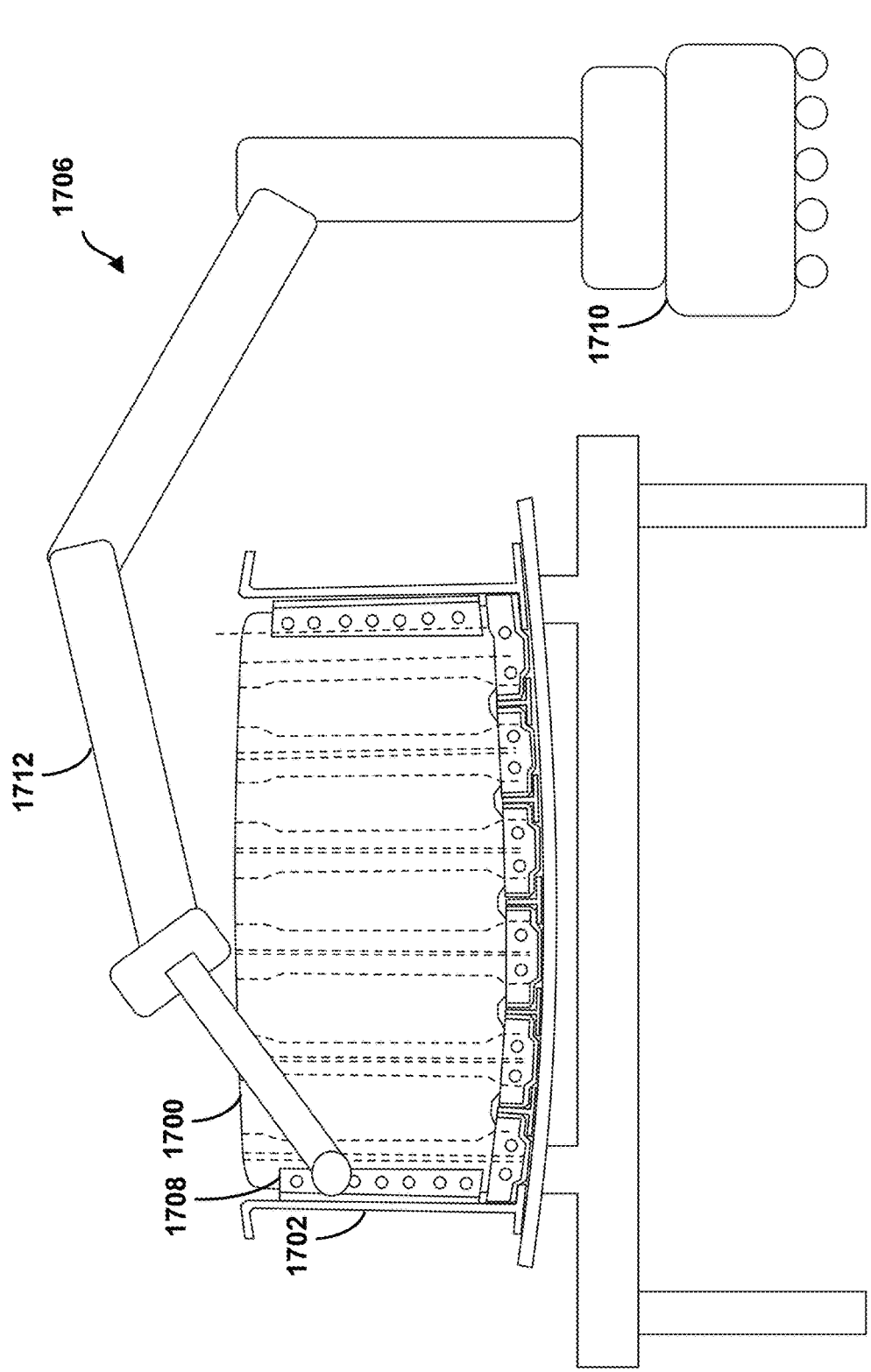
FIG. 17 illustrates fastening of a rib to a composite spar, according to an example.

FIG. 17 illustrates fastening of a rib 1700 to a composite spar 1702, according to an example. More specifically, FIG. 17 shows a robotic device 1706 fastening rib 1700 to a rib post 1708 of composite spar 1702. Robotic device 1706 can include a movable base 1710 and a robotic arm 1712.

Figure 18:
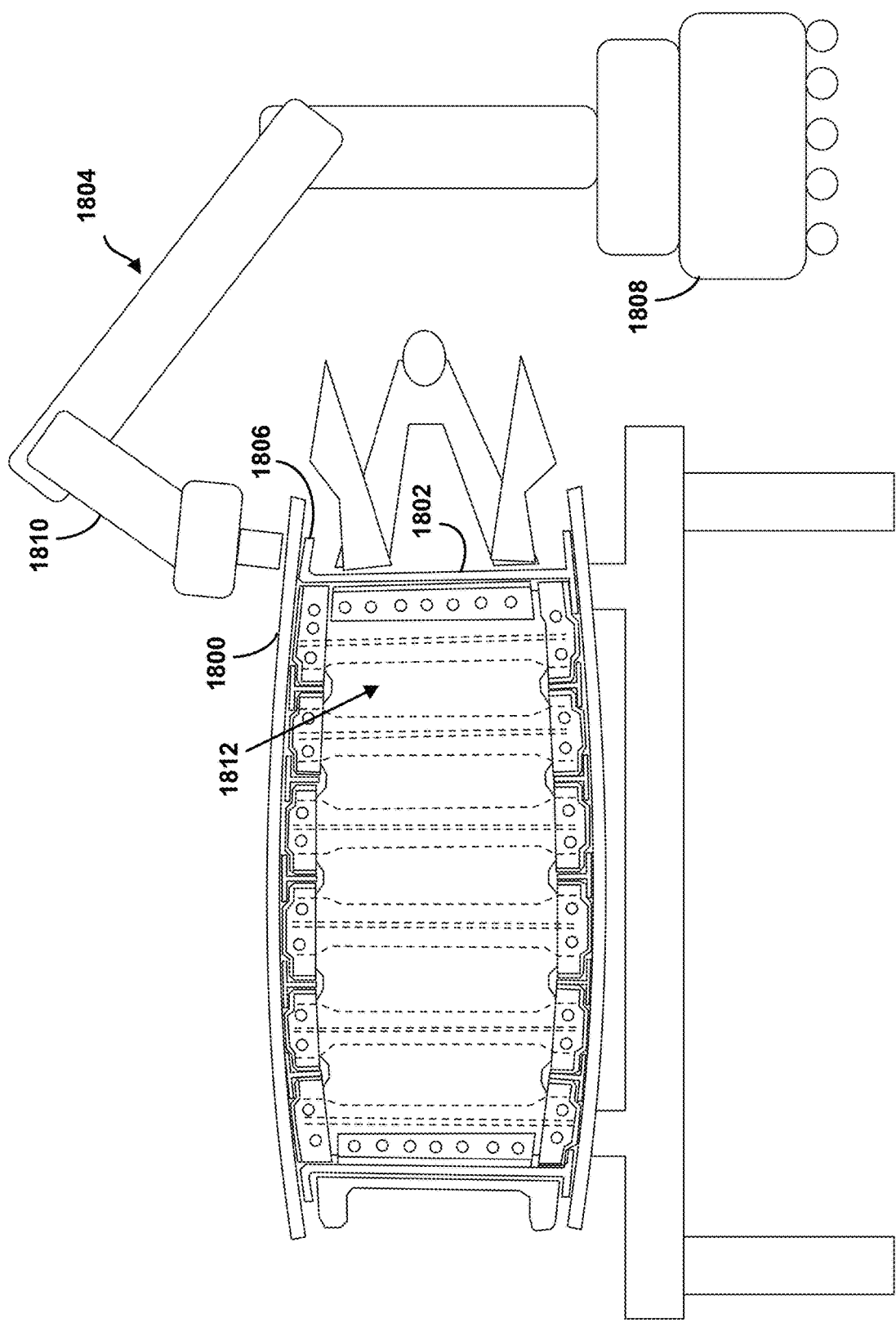
FIG. 18 illustrates fastening of a second skin to a composite spar, according to an example.

FIG. 18 illustrates fastening of a second skin 1800 to composite spar 1802, according to an example. More specifically, FIG. 18 shows a robotic device 1804 fastening second skin 1800 to an outward-facing flange 1806 of composite spar 1802. Robotic device 1804 can include a movable base 1808 and a robotic arm 1810. Robotic device 1804 and robotic device 1706 of FIG. 17 could be the same robotic device. In line with the discussion above, because composite spar 1802 includes outward-facing flange 1806, robotic device 1804 can fasten second skin 1800 to composite spar 1802 without having to access an interior of 1812 of an aircraft wing.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A composite spar for an aircraft wing, the composite spar comprising:
   a double-flanged spar cap comprising an inward-facing flange and a first outward-facing flange, the inward-facing flange and the first outward-facing flange configured to be integrated with a first skin of the aircraft wing during a co-curing process;
   a single-flanged spar cap comprising a second outward-facing flange, the second outward-facing flange configured to be attached to a second skin of the aircraft wing, the second skin being opposite to the first skin;
   a spar web connecting the double-flanged spar cap and the single-flanged spar cap, the spar web having a top half and a bottom half;
   a first tear strap configured as a strip of composite material stitched to an inner side of the top half of the spar web along at least a portion of a length of the composite spar, wherein the first tear strap is offset from the single-flanged spar cap by a first distance that is less than half of a height of the composite spar; and
   a second tear strap configured as a strip of composite material stitched to the inner side of the bottom half of the spar web along the portion of the length of the composite spar, wherein the second tear strap is offset from the double-flanged spar cap by a second distance that is less than half of the height of the composite spar.

2. The composite spar of claim 1, further comprising a plurality of rib posts stitched to the inner side of the spar web, the plurality of rib posts configured to be attached to ribs of the aircraft wing.

3. The composite spar of claim 2, wherein the plurality of rib posts are integrated with the spar web during the co-curing process.

4. The composite spar of claim 1, further comprising a stiffener stitched to the inner side of the spar web along at least a portion of the height of the composite spar.

5. The composite spar of claim 4, wherein the stiffener supports the inward-facing flange.

6. The composite spar of claim 4, wherein the stiffener is integrated with the spar web during the co-curing process.

7. The composite spar of claim 4, wherein the composite spar comprises a first rib post and a second rib post, and wherein the stiffener is positioned between the first rib post and the second rib post.

8. The composite spar of claim 1, wherein the spar web comprises a plurality of plies, and wherein more than thirty percent of the plurality of plies of the spar web are oriented generally parallel to a longitudinal axis of the composite spar.

9. The composite spar of claim 8, wherein at least forty percent of the plurality of plies of the spar web are oriented generally parallel to the longitudinal axis of the composite spar.

10. The composite spar of claim 1, wherein the second outward-facing flange comprises a plurality of holes for positioning and fastening the second outward-facing flange to the second skin of the aircraft wing.

11. An aircraft wing comprising:
    a first skin;
    a second skin opposite to the first skin; and
    a composite spar comprising:
       a double-flanged spar cap comprising an inward-facing flange and a first outward-facing flange, the inward-facing flange and the first outward-facing flange stitched to the first skin and integrated with the first skin during a co-curing process,
       a single-flanged spar cap comprising a second outward-facing flange, the second outward-facing flange attached to the second skin,
       a spar web connecting the double-flanged spar cap and the single-flanged spar cap, the spar web having a top half and a bottom half,
       a first tear strap configured as a strip of composite material stitched to an inner side of the spar web along at least a portion of a length of the composite spar, wherein the first tear strap is offset from the single-flanged spar cap by a first distance that is less than half of a height of the composite spar, and
       a second tear strap configured as a strip of composite material stitched to the inner side of the spar web along the portion of the length of the composite spar, wherein the second tear strap is offset from the double-flanged spar cap by a second distance that is less than half of the height of the composite spar.

12. The aircraft wing of claim 11, wherein the composite spar is a front spar, and wherein the aircraft wing further comprises a rear spar having a double-flanged spar cap and a single-flanged spar cap.

13. The aircraft wing of claim 12, wherein the composite spar further comprises a plurality of rib posts stitched to and integrated with the inner side of the spar web during the co-curing process, the plurality of rib posts configured to be attached to ribs of the aircraft wing.

14. The aircraft wing of claim 12, wherein the composite spar further comprises a stiffener stitched to and integrated with the inner side of the spar web along at least a portion of the height of the composite spar during the co-curing process.

15. A method of assembling an aircraft wing, the method comprising:
    integrating a double-flanged spar cap of a front spar of the aircraft wing and a double-flanged spar cap of a rear spar of the aircraft wing with a first skin of the aircraft wing during a co-curing process;
    integrating a first tear strap with an inner side of a top half of a spar web of the front spar during the co-curing process, wherein the first tear strap configured as a strip of composite material and is offset from a single-flanged spar cap of the front spar by a first distance that is less than half of a height of the front spar;
    integrating a second tear strap with an inner side of a bottom half of the spar web of the front spar during the co-curing process, wherein the second tear strap configured as a strip of composite material and is offset from a double-flanged spar cap of the front spar by a second distance that is less than half of the height of the front spar;

after the co-curing process, fastening a plurality of ribs to the spar web of the front spar and to a spar web of the rear spar; and fastening the single-flanged spar cap of the front spar and a single-flanged spar cap of the rear spar to a second skin of the aircraft wing, the second skin being opposite to the first skin.

16. The method of claim 15, further comprising integrating a plurality of rib posts with an inner side of the spar web of the front spar during the co-curing process.

17. The method of claim 15, further comprising integrating a stiffener with an inner side of the spar web of the front spar during the co-curing process.

18. The aircraft wing of claim 12, wherein the single-flanged spar cap of the rear spar comprises an outward-facing flange.

19. The aircraft wing of 11, wherein the second outward-facing flange comprises a plurality of holes for positioning and fastening the second outward-facing flange to the second skin.

20. The method of claim 15, wherein fastening the single-flanged spar cap of the front spar to the second skin comprises inserting a fastener through a hole in an outward-facing flange of the single-flanged spar cap of the front spar and a hole in the second skin.

* * * * *